Oct. 6, 1970   C. R. MANNING, JR., ET AL   3,531,964
CONTROLLED GLASS BEAD PEENING
Filed Aug. 31, 1967   4 Sheets-Sheet 1

INVENTORS
CHARLES R. MANNING, JR.
THOMAS T. BALES
BY WAYNE B. LISAGOR
MARION B. SEYFFERT
ATTORNEYS

3,531,964
CONTROLLED GLASS BEAD PEENING

Charles R. Manning, Jr., Thomas T. Bales, and Wayne B. Lisagor, Newport News, and Marion B. Seyffert, Hampton, Va., assignors to the United States of America as represented by the Administrator of the National Aeronautics and Space Administration
Filed Aug. 31, 1967, Ser. No. 665,681
Int. Cl. B21j 5/00
U.S. Cl. 72—53    20 Claims

ABSTRACT OF THE DISCLOSURE

A method and apparatus for inducing compressive stresses in a pressure vessel to prevent stress corrosion. The apparatus consists of mechanism for rotating the pressure vessel while a lance carrying a nozzle supplied with beads traverses the entire inside surface of the pressure vessel uniformly peening the material to introduce the stress.

---

The invention described herein was made by employees of the United States Government and may be manufactured and used by or for the Government for governmental purposes without the payment of any royalties thereon or therefor.

This invention relates to a method and apparatus for preventing stress corrosion in a pressure vessel, and more particularly to introducing a compressive stress in the inner surface of the pressue vessel by peening.

Many of the fuel tanks utilized in today's spacecraft must store rocket engine propellants which are highly corrosive. Stress corrosion is greatly accelerated when the tanks are pressurized and very small surface flaws are propagated in the inner surface of the tank due to the combined effect of corrosive media and tensile stress in the tanks. For example, fuel tanks constructed of titanium alloy utilized to contain nitrogen tetroxide have failed under tests in a period of three or four days due to stress corrosion.

One solution to the problem is to increase the thickness of the material from which the tank is constructed. This remedy is not generally feasible in the space program, however, because of the increased weight of the tank.

Another approach to the problem is to utilize bladders inside the pressure vessels to prevent the fuel from coming in contact with the surfaces of the fuel tank. Although this arrangement is successful in many instances, there are also many problems attendant to the use of bladders. Some of these problems include inserting the bladder in the fuel tank and making it conform with the shape of the fuel tank without wrinkling. If the bladder is wrinkled, it can develop leaks later upon pressurization of the tank. Of couse, the addition of the bladder adds unwanted weight to the fuel tank, and permeability of the liquid through the bladder allows the liquid to come in contact with the tank wall. The collapse of the bladder upon fuel discharge from the tank has also caused many problems in fuel discharge and tank emptying.

This invention overcomes the above enumerated difficulties by inducing residual compressive stresses into the inner surface of the tanks of such a magnitude that the exposed surface remains in compression rather than tension when the tanks are pressurized.

It is, therefore, an object of this invention to provide a method of preventing stress corrosion in pressure vessels by inducing compressive stresses into the inner surface thereof.

Yet another object of this invention is to provide apparatus for peening the inner surface of the tank to induce compressive stresses.

Still another object of the invention is to provide apparatus for uniformly peening either spherical or cylindrical shaped pressure vessels of various sizes.

An additional object of the invention is to provide apparatus which will peen large thin-skinned pressure vessels.

A further object of the invention is to provide apparatus for peening a pressure vessel which is relatively simple in construction and is easy to operate and maintain.

Yet another object of the invention is to provide an apparatus for glass bead peening pressure vessels wherein the material used for peening may be recovered and reused.

An added object of the invention is to improve the inner surface characteristics of the pressure vessel, such as elimination of stress concentrations, by uniform peening.

These and other objects and advantages of the invention will become more apparent upon reading the specification in conjunction with the accompanying drawings.

In the drawings:

FIG. 5 is a perspective view showing a multiple nozzle arrangement.

Basically, the invention consists of an apparatus having several components which function as a combination to provide the peening operation. Briefly, the invention includes a support structure consisting of a pair of beams tied together with cross members forming a support for much of the structure. Located on one end of the support structure is a cradle which is utilized to carry the pressure vessel to be peened. The cradle is rotatably mounted on the support structure through a friction drive arrangement. The other end of the support structure is provided with rails upon which a wheeled carriage is adapted to move. The carriage carries a lance having a bead peening nozzle mounted on its end. A motor and drive train are connected to the carriage and utilized to advance the lance in the pressure vessel. A drive mechanism is associated with the nozzle such that it can traverse an arc to effectively peen the curved surfaces of the pressure vessel. Bead propelling mechanism is attached to the nozzle to supply beads for peening purposes. Programmer and control circuits are associated with the various elements to accomplish uniform peening of the pressure vessel.

Figure 1:
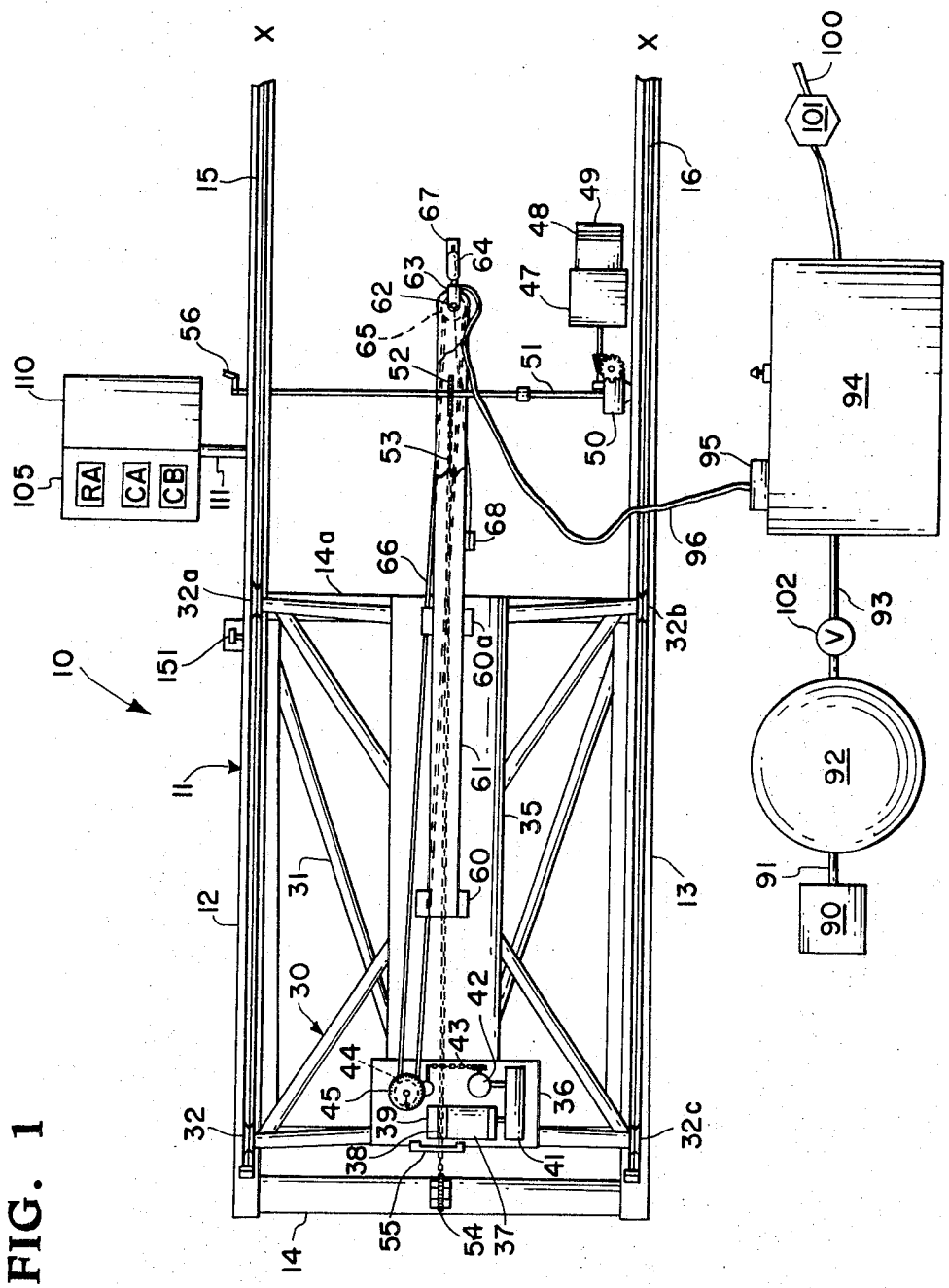
FIG. 1 is a plan view of a portion of the bead peening apparatus showing part of the support structure, and mechanism attendent thereto.
Figure 2:
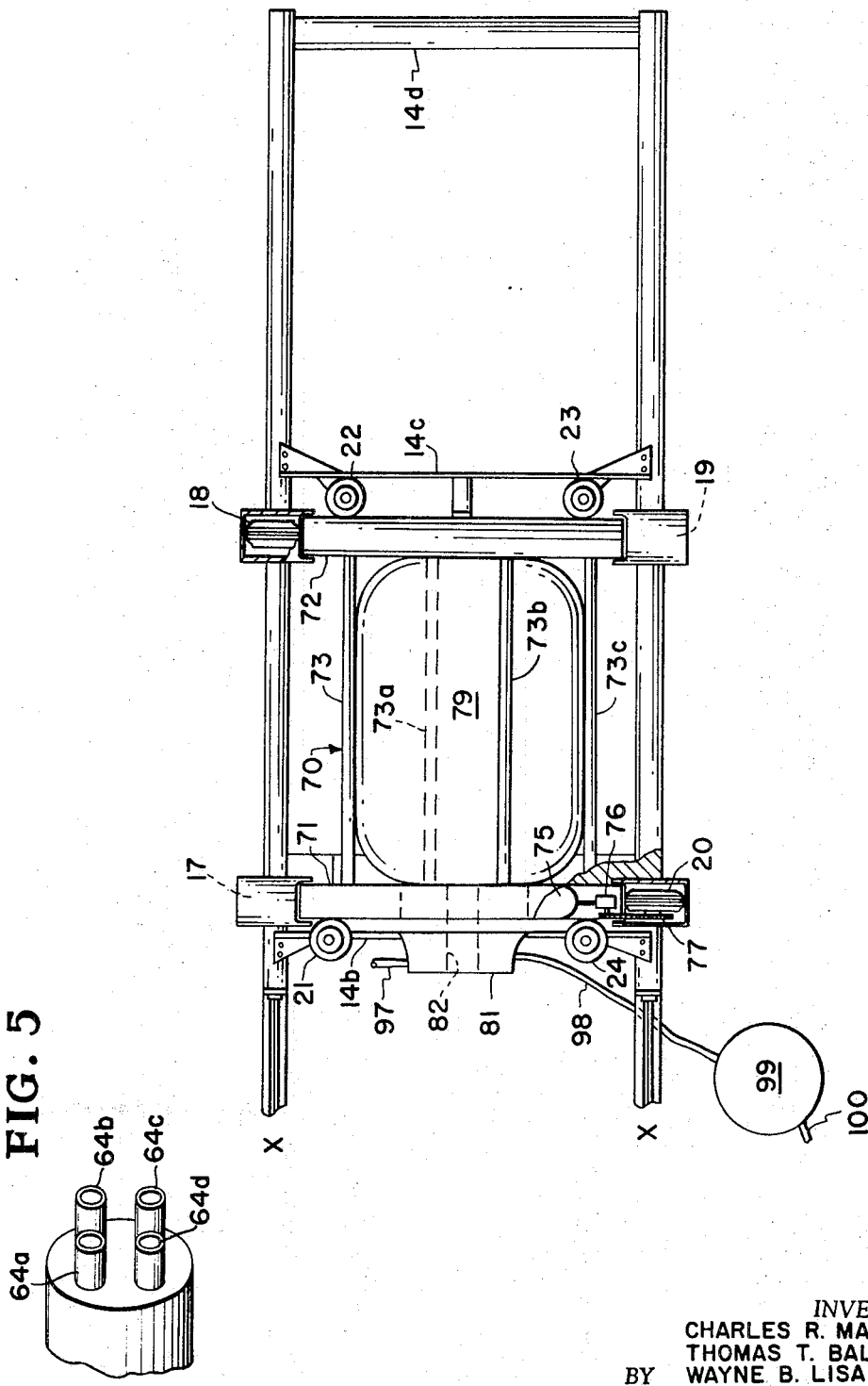
FIG. 2 is a plan view of the other portion of the bead peening apparatus showing the remaining support structure, and apparatus associated therewith.

Referring now more specifically to the details of the invention, FIGS. 1 and 2 show the overall bead peening apparatus designated generally by the reference numeral 10. FIG. 1 shows the part of the support structure which carries the carriage, lance, nozzle and associated drive equipment. The bead propelling mechanism and the programing and control mechanism are also shown schematically in FIG. 1. FIG. 2 shows the other end of the support structure which is attached at the break lines X—X. This portion of the support structure carrying the cradle and its drive mechanism.

The support structure is designated generally by the reference numeral 11 and includes a pair of support beams 12 and 13 which are located in spaced parallel relationship. The beams 12 and 13 are tied together by structural tie members 14, 14a, 14b, 14c and 14d. Rails 15 and 16 are fixed to the respective beams and extended from one end of the beams to the point adjacent the cradle providing a runway for a carriage to be explained more fully hereinafter.

Bearings 17 and 18 are fixed to the beam 12. Opposing bearings 20 and 21 are fixed to the beam 13. These bearings are of a conventional design and are constructed to support rings of the cradle. Locator assemblies 21 and 22 are also carried by the beam 12 and are positioned adjacent the bearings 17 and 18. These assemblies include a bracket and wheel arrangement rotatably mounted thereon. Similar locator assemblies are carried by the beam 13, the assembly 24 opposing the assembly 21, and the assembly 23 opposing the assembly 22. These assemblies are adapted to engage the ends of the cradle ring structure to prevent longitudinal movement of the cradle.

A carriage designated generally by the reference numeral 30 is constructed of a series of structural members to take up a frame 31 which is pyramid-like in shape. Wheels 32, 32a, 32b and 32c are rotatably mounted on the respective corners of the carriage. The wheels 32 and 32a engage the rail 15 and the wheels 32b and 32c, the rail 16. Carriage 30 can thus travel from one end of the rail to the other in a conventional manner. Stops, of a conventional design, may be placed at the ends of the rails to prevent derailment of the carriage.

A mounting plate 35 is secured to the upper framework of the carriage and provides a flat supporting surface for mounting various elements of the apparatus. Located at one end of the mounting plate 35 is a base plate 36 which is secured thereto by bolts or other conventional fasteners. The base plate 36 supports a radius motor 37 which has associated with it a clutch and brake 38 and 39, respectively. The clutch and brake are of the magnetic type and formed integral with the motor housing in a manner known in the prior art. A drive train 41 connects the output of the radius motor 37 with a reduction gear 42. The reduction gear 42 is also available commercially. Another drive train 43 connects the output of the reduction gear 42 with a winding drum 44, utilized to move the bead peening nozzle through an arc in a manner to be described subsequently. An indicator 45 is connected to the shaft of the winding drum and has a punter and scale arrangement which indicates the degrees of movement of the peening nozzle. Limit switches utilized in controlling operation of the nozzle are associated with the indicator and are activated by the indicator for purposes which will be explained in detail in describing apparatus circuitry.

A lance motor 47 is located adjacent the beam 13. This motor also has a magnetic clutch and brake 48 and 49 (of conventional design) associated with it. The output shaft of the lance motor 47 is connected directly to a state of the art reduction gear 50.

The output of reduction gear 50 is connected to a drive shaft 51 which extends across the support structure and through the beam 12. A portion of the shaft 51 is journaled in the beam 12. A sprocket 52 is keyed to the drive shaft 51 midway between beams 12 and 13. A chain 53 is entrained over the teeth of the sprocket and the teeth of a return sprocket 54 which is mounted on the tie member 14. A chain clamp 55 connects the chain to the carriage 30 at a point below the radius motor of base plate 36. It is believed apparent that rotation of the sprocket 52 by the lance motor 47 will result in the carriage being moved on the rails 15 and 16. A crank 56 is attached to the end of the drive shaft 51 which extends through the beam 12, the crank being utilized to position the lance for controlled peening and to return the carriage to its normal starting position once the peening operation has been completed.

Lance brackets 60 and 60a are secured to the mounting plate 35 at spaced intervals and are adapted to hold the lance 61. The lance 61 is an elongated channel shaped member having one end thereof connected to lance mount 60 and a portion approximately midway thereof fixed to the lance mount 60a. The remainder of the lance projects beyond the carriage toward the other end of the support. The lance should be of sufficient length so that the porion thereof extending beyond the carriage is capable of penetrating to the furthest extremity of the pressure vessel.

A nozzle pivot 62 is associated with the end of the lance furthest from the carriage. A nozzle arm 63 engages the nozzle pivot, and supports the nozzle 64. This pivotal connection allows the nozzle 64 to swing through an arc greater than 180°. A drum 65 is connected to the nozzle arm 63 and is adapted to receive a winding cable 66 which is entrained about this winding drum and the winding drum 44. Movement of the winding drum 44 is thus conveyed to the drum 65 resulting in the nozzle arm moving and the nozzle transcribing an arc.

The nozzle 64 is of a conventional design and operates on the aspirator principle (air flowing through the nozzle picks up the beads and propels them against the surface to be peened). A single nozzle may be utilized, or a multiple type nozzle if it is desired to cover a greater area of the material being peened. A multiple nozzle is shown in FIG. 5, the nozzles being designated 64a, 64b, 64c and 64d. The length of the nozzle arm 63 is variable to accommodate various sizes and shapes of tanks being peened. A flapper 67 is adapted to cover the nozzle outlets and to deflect the beads. The flapper is merely a rectangular piece of flexible material which partially covers the nozzle discharge. Use of the flapper is desirable to prevent peening until the flow of beads is at the right rate and pressure. At that time a flapper control 68 may be operated to expose the nozzle discharge to the material being peened. The nozzle control 68 may be nothing more than a cable attached to a lever positioned on the lance. Operation of the lever merely withdraws the flapper from the nozzle. This may be done manually, or the flapper control may be operated by a solenoid.

A cradle 70 (FIG. 2) is located on the support structure at the end thereof opposite that carrying the carriage. The cradle 70 has a pair of ring structure members 71 and 72. These members are connected together by spacer bars 73, 73a, 73b and 73c, this structure making up a cradle or cage which houses the pressure vessel. The ring structure members 71 and 72 rest on the bearings 17, 18, 19 and 20, the cradle being rotatably supported thereon. The locator assemblies 21, 22, 23 and 24 engage the ends of the ring structure members to longitudinally position the cradle and a pressure vessel carried thereby. The bearings 18 and 19, the assemblies 22 and 23 and the ring support 72 can be made so as to be adjustable on the beams 12 and 13 to accommodate tanks of various sizes. The spacer bars 72, 72a, 72b and 72c would also be adjustable to tie the cradle together as an element.

A variable speed cradle motor 75 is located adjacent the tie member 14d and the support beam 13. The output of the motor is connected to a reduction gear 76. A drive train 77 associated with the reduction gear and bearing wheel 20 provides the structure for rotating the bearing and drive wheel 20. The wheel 20 is in frictional engagement with the ring structure 71, resulting in a friction drive for the cradle 70.

A pressure vessel 79 is shown associated with the cradle 70. Although the pressure vessel may be made of various type of material, one type of material generally used for pressure vessels utilized in the space environment is a titanium alloy (TI–6A1–4V). The pressure vessel has an opening 80 which provides access to the interior of the vessel to accomplish peening, and of course, provides a means for filling the pressure vessel with rocket fuel, and for feeding fuel to a rocket motor. A manifold 81 is associated with the pressure vessel and surrounds the opening thereof. The manifold functions in the usual manner of a manifold providing an opening 82 for the lance, an exhaust vent and a coupling for a vacuum system to be explained more fully hereinafter.

Returning to FIG. 1, an air supply 90 which may be a compressor or other suitable source of air is shown positioned adjacent the support structure. A supply line 91 connects the air supply with an air drier 92. The air drier 92 may be of the desiccant type or other types available commercially. Dry air helps maintain uniform flow of glass beads used for peening. The dry air is conveyed by line 93 to the bead propelling apparatus 94. The bead propelling apparatus is also available commercially. A monitor 95 is connected to the bead propelling apparatus and functions to sense the rate of bead flow and pressure associated therewith so that the flow of beads from the bead propelling apparatus to the nozzle may be controlled. Monitoring is accomplished by leading the current from a static charge on the glass beads flowing in the hose. A monitor similar to that shown in U.S. Pat. No. 2,994,035 has been found suitable for this purpose. If the rate of flow is not uniform a visual or audio device will so indicate and the apparatus can be shut down for adjustment. Bead and air supply hoses 96 are connected between bead propelling machine 94, the monitor 95 and the nozzle 64. The nozzle 64 may be of the aspirator type whereby air flowing through the nozzle draws beads through the nozzle and imparts the velocity to the bead necessary to impinge it against the pressure vessel for peening purposes.

A manifold vent 97 is connected to the manifold 81. The manifold vent provides means whereby an atmospheric condition may be maintained within the pressure vessel during peening. A vacuum line 98 is connected to the manifold 81 and is associated with the interior of the pressure vessel. The cradle 70 may be canted a few degrees (2.5 to 3.0 degrees) on the support structure such that the manifold end of the pressure vessel is slightly lower than the other end of the vessel. This arrangement causes the used beads, broken beads, dust and debris to move under the influence of gravity to the vicinity of the manifold. The vacuum line 98 picks up the used beads and draws them into the separator 99. The separator 99 is also of a conventional design, and may be of the shaking type having a screen wherein the good, used beads are separated from the broken beads, dust and other debris, The good, used beads are then returned to the bead propelling apparatus 94 of bead return line 100. An auxiliary bead supply 101 is placed in the line 100. In using the apparatus, it was found that when 40 percent of the bead supply was broken the peening efficiency dropped off. Thus, new beads are supplied at this point of breakage by the auxiliary bead supply 101. The auxiliary bead supply is in the form of a hopper (shown diagrammatically as 101) and the additional beads are poured into the hopper 101. It was also found during test that an increase in pressure as the beads gradually broke to the 40 percent figure helped maintain peening effectiveness. Accordingly, the pressure is increased gradually until the beads are re-supplied. This is done manually by turning a conventional valve 102 (FIG. 1) or can be done automatically by the use of a conventional timer and solenoid associated with the valve since the average bead breakage over a time interval can be calculated. A vacuum pump is associated with the bead propelling apparatus to draw the beads back to it.

A programmer 105 is located adjacent the support structure and is associated with a controller 110. Electrical conduit 111 connects this mechanism with the various motors and control elements of the apparaus. The programmer 105 is of a conventional design, and is of the drum type, wherein a motor rotates the drum which carries a program. There are three drums which control three different phases of operation. The radius drum RA programs movement of the radius motor 37 and thus movement of the nozzle 64. Another drum CA programs the speed of rotation of the cradle 70 during peening of the flange end or the end of the pressure vessel that has an opening. The third drum CB programs the speed of rotation of the cradle 70 during peening of the closed end of the vessel. A pickup is associated with each of the drums the output of which is fed to the controller 110. The controller 110 has potentiometers which are varied according to programs, which vary the speed of the motors.

OPERATION

From the above description of the apparatus, the method and apparatus of the invention is believed to be generally understood. However, a detailed description of the operation is herein set forth with a description of an electrical circuit which may be used for semiautomatic peening of a pressure vessel.

The electrical circuit 120 (FIG. 4) has a feedline 121 and a return line 11 having a 110-volt potential thereacross supplied from a stepdown transformer T1. The line 121 has a master switch 123 which when closed enables the major components of the circuit to be energized.

Figure 3:
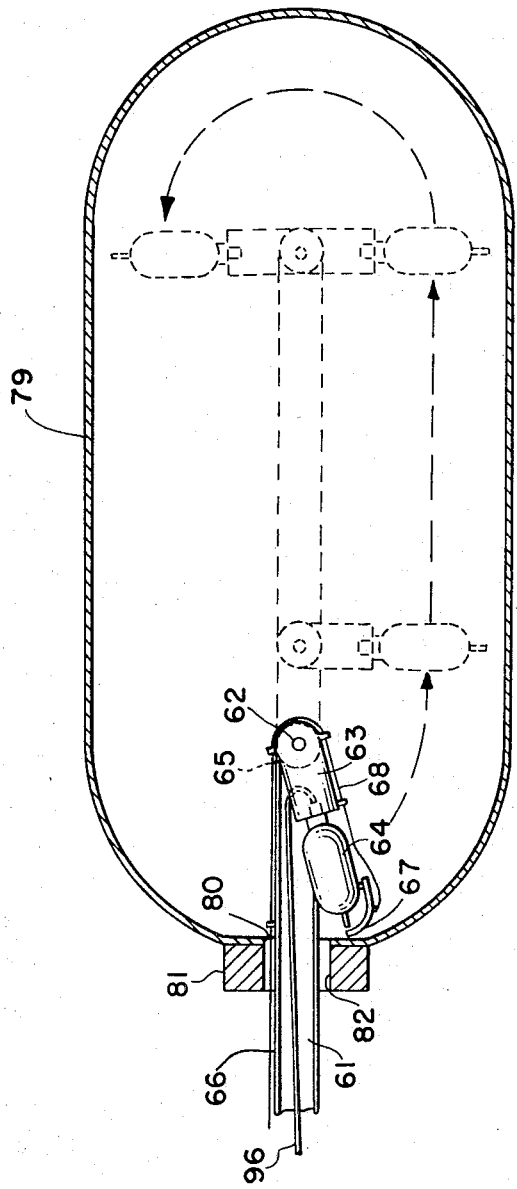
FIG. 3 is a cross sectional view of a fuel tank showing the peening apparatus inserted in the tank, and the sequential movement of the apparatus in a peening cycle.

Prior to closing the master switch 123, however, the carriage 30 and lance 61 should be advanced so that the nozzle 64 can assume the position shown in solid line in FIG. 3. The nozzle is at an angle of approximately 15° with the longitudinal axis of the lance. This angle can be determined by viewing the indicator 45. The lance and carriage is advanced manually by the crank 56 and the nozzle angle can also be set manually.

The master switch 123 is then closed and the switches 125, 126 and 127 are closed completing a circuit to the radius motor 37, lance motor 47 and cradle motor 75, respectively. The programmer switch 124 is closed causing the cradle programmer motor 130 to start. The cradle controller 110 is also energized at this time.

The air supply 90, air dryer 92, bead propelling apparatus 94, auxiliary bead supply 101 and separator 99 are also started at this time by closing switch 131.

The cradle program motor 130 runs for a short time turning a programed drum CA which is associated therewith. This time interval is allowed to enable the cradle motor 75 to bring the cradle 70 and pressure vessel 79 carried thereby up to a stabilized rotating speed. A trip connected to the programed drum CA closes a limit switch 132 which picks up a relay 133. The closing of the limit switch also starts a programmer clock 135. The relay contact 134 locks in the relay 133 and the clock 35 to maintain operation throughout the peening cycle.

Another contact 140 of relay 133 is closed completing a circuit to clutch 38 and brake 39 of radius motor 37. The brake is thus released, and the cultch engaged starting the operation of the radius motor. Prior to the starting of the radius motor the beads from the bead propelling apparatus are striking the flapper 67. At this point control 68 is actuated and the flapper 67 removed so that the beads impinge against the inner surface of the tank and the peening operation starts.

The radius motor 37 drives the winding drum 44 which in turn moves the winding cable 65 and the nozzle 64 transcribes an arc. The speed of the radius motor 37 is controlled by programed drum RA the motor 139 of which is also energized by the closing of contact 140 previously described.

The programed drum CA has a predetermined line drawn thereon which is followed by a pickup mechanism. The output of the pickup mechanism is fed to the controller 110. The input to the controller regulates a potentiometer which in turn varies the speed of motor 75 to provide the correct cradle speed rotation to properly peen the flanged or open end of the pressure vessel. The programed drum RA controls the speed of the radius motor 37 and thus the angular speed of the nozzle.

The programed motor speeds are determined by establishing the effective spot size of the nozzle or nozzles and then employing the following relationships:

$$\phi(t) \approx \frac{-\omega_0 \left(\frac{\Delta S}{2\pi R}\right)}{\sqrt{1+\left(\frac{\Delta S}{2\pi R}\right)^2 [1-\omega_0^2(t-t_0)^2]}}$$

$$\omega(t) \approx \frac{\omega_0}{\sqrt{1+\left(\frac{\Delta S}{2\pi R}\right)^2 [1-\omega_0^2(t-t_0)^2]}}$$

where $\phi(t)$ is the nozzle angle movement
$\omega$ is the rate of tank rotation in the dome portion of vessel
$\omega_0$ is the rate of tank rotation in the cylindrical section of the vessel
$\Delta S$ is the effective spot size
$R$ is the radius of the tank
$t$ is time.

These equations are used to obtain values for $\dot\phi$ and $\omega$ versus time which are plotted on the drum-type programmers to control the nozzle movement and tank rotation for the peening of the hemispherical or spherical tanks.

Peening continues until the nozzle reaches a position perpendicular to the cylindrical portion of the pressure vessel at which point a limit switch 136 is closed. The limit switch 136 is physically located to be tripped by the indicator 45. This limit switch is termed the 90° radial limit switch since the nozzle is at a 90° angle with respect to the longitudinal axis of the lance at this position. Closing of the limit switch 136 picks up relay 137 causing its normally closed contact 128 to open. This opens the circuit to the cradle program motor 130 and shuts down the motor and its programed drum function. Another normally closed contact 141 of relay 137 is opened, breaking the circuit to clutch 38 and brake 39 of the radius motor 37 causing the clutch to disengage and the brake to engage thereby stopping the output from the radius motor. A third normally open contact 142 of realy 137 closes and completes a circuit to the clutch 48 and brake 49 of lance motor 47. The clutch 48 is thus engaged and brake 49 released resulting in rotation of the reduction gear 50 and output shaft 51. The output shaft 51 rotates the sprocket 52 moving the chain 53 which is clamped to the carriage 30. The carriage 30 is thus moved forward along the cylindrical portion of the pressure vessel peening the cylindrical portion of the pressure vessel. The cradle motor 75 continues to rotate at the speed determined by the output from the reduction gear and associated power train.

When the lance reaches the end of the cylindrical portion of the pressure vessel the normally closed contact 151 and the normally opened contact 152 of a lance limit switch are opened and closed, respectively. The nozzle is now in the dotted line position shown in FIG. 3. Opening of contact 151 breaks the circuit to the lance motor clutch 48 and brake 49, disengaging the clutch and applying the brake, thus stopping the output from the lance motor 47.

Closing of contact 152 energizes relays 152, 153 and another program motor 154 and its drum CB in the programmer 105. The contact 129 of relay 152 is opened to maintain the program motor 131 out of the circuit. Normally opened contact 138 of relays 152 is closed to again energize the radius program motor 139. The same contact 138 also completes a circuit to the cultch 38 and brake 39 of the radius motor, releasing the brake and enerigizing the clutch resulting in an output from the radius motor 37 and in turn the winding drum 44. The nozzle 64 thus again starts to transcribe an arc to peen the closed end of the pressure vessel. The output from the programed drum CB associated with the program motor 154 is again picked up and fed to the controller 110. The relay 153 transfers the input information to another potentiometer in the controller, the output from this potentiometer again controlling the speed of the cradle motor 75.

When the nozzle 64 has transcribed an arc of 180° (as shown by the arrow in FIG. 3), the normally closed limit switch 155 is opened shutting down the complete circuit. The switch 155 is physically located so that it is tripped by the indicator 45. The inner surface of the pressure vessel is then completely peened and the peening operation complete. The lance 61 is normally withdrawn from the pressure vessel manually by rotating crank 56 associated with the end of the lance drive shaft 51. The pressure vessel can then be removed from the cradle 70. The pressure vessel may be cleaned to remove any of the dust and debris which may have remained in the vessel.

Figure 4:
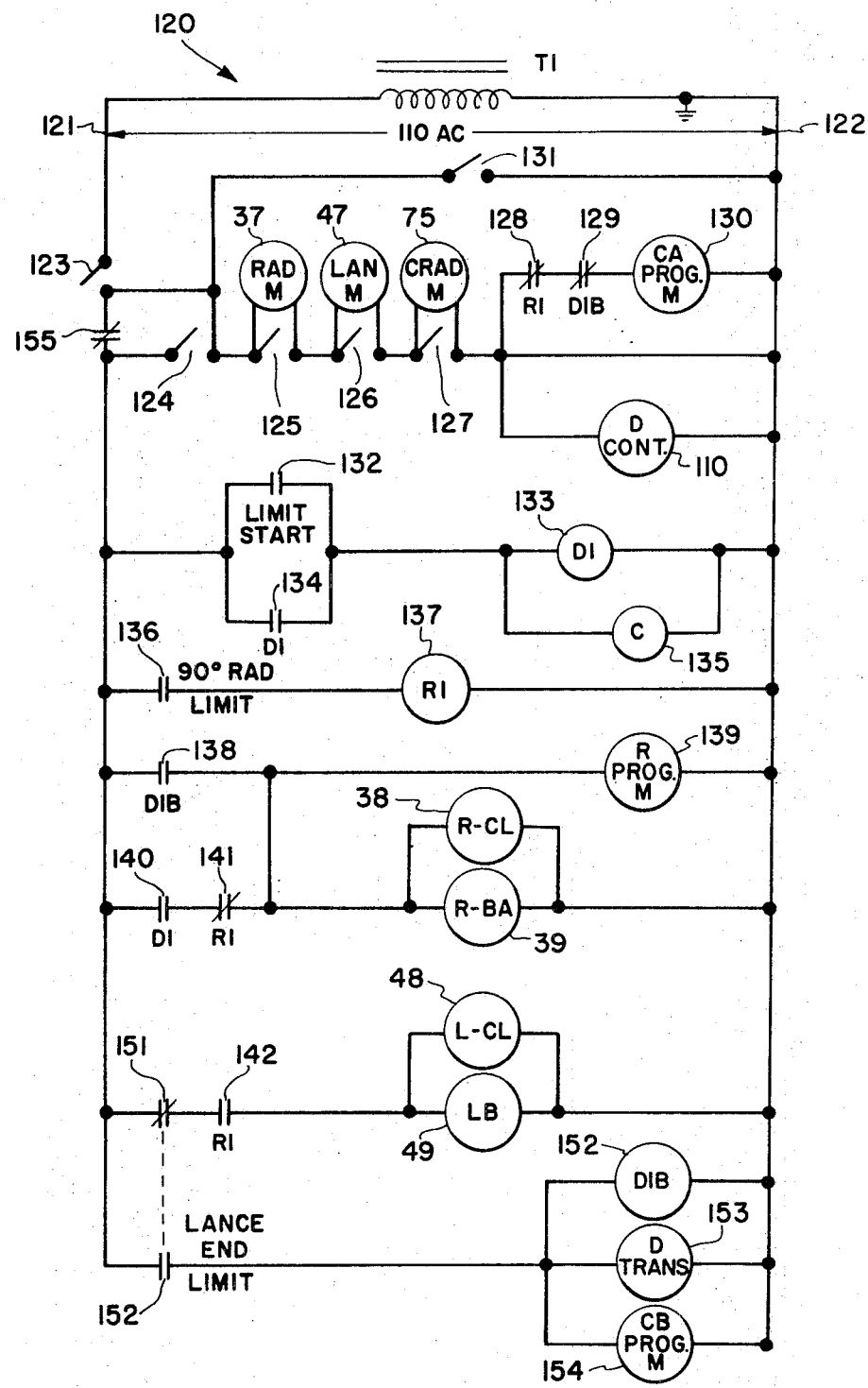
FIG. 4 is an electrical diagram showing the circuitry associated with the apparatus for programing and controlling the operation of the machine.

Although the electrical circuit in FIG. 4 shows an automatic operation for the peening sequence, it is believed to be apparent to one skilled in the art to add the necessary switches and relays to the circuit to provide for manual operation of each of the motors and components to manually operate the apparatus. Since uniform peening of the inside surface of the tank is the desired objective, the programed automatic operation of the apparatus is normally more accurate and preferable over manual operation.

From the above description of the invention, the advantages of the method and apparatus to prevent stress corrosion in a pressure vessel utilized to store corrosive media is believed to be apparent. By inducing a compressive stress in the inner surface of the pressure vessel, the tensile stress normally appearing in an unpeened pressure vessel subjected to pressure is eliminated. Accordingly, the inner surface flaws which occur on pressurization of the fuel tanks are eliminated with the attendant highly active corrosion. The apparatus utilized provides a mechanism for uniformly peening the interior of the pressure vessel, the uniformity of the peening also resulting in uniform compressive stresses being induced. This also tends to eliminate points of stress concentration in the pressure vessel which might have been induced in manufacture due to the geometrical design or shape of the tank. The intensity or magnitude of the peening can be varied to control the depth of the compressive stress into the tank material to meet the requirements of the particular fuel storage situation. The apparatus can also be utilized to peen tanks of various sizes and shapes with minor modifications to the equipment. The peening of the tank does not lower the tensile yield strength of the tank material to any appreciable degree. Thus, the thickness and weight of the tank material remains substantially the same as that of an unpeened tank. It has also been found that peening the tanks does not adversely affect the overall dimension of the tank which must be maintained within certain tolerances to be useful as a fuel tank for space hardware. It has also been determined that peening the inner surface of the tank reduces the friction between the bladder and the vessel wall should a bladder also be utilized.

While a preferred embodiment of this invention has been described, it will be understood that modification and improvements may be made thereto. Such of these modifications and improvements as incorporate the principles of this invention are to be considered as included in the hereinafter appended claims unless these claims by their language expressly state otherwise.

What is claimed as new and desired to be secured by Letters Patent of the United States is:

1. An apparatus for peening pressure vessels and the like comprising:
   support means;
   cradle means adapted to rotatably support a pressure vessel on said support means;
   lance means movably mounted on said support means;

nozzle means pivotally mounted on said lance means;
bead propelling apparatus connected to said nozzle means;
power means for energizing said cradle means, lance means, nozzle means and bead propelling apparatus; and
control means for directing the operation of the above-mentioned means whereby the lance means and nozzle means travel inside said pressure vessel in a manner such that beads from the bead propelling apparatus and nozzle uniformly peen the pressure vessel.

2. An apparatus for peening pressure vessels and the like as in claim 1 wherein said support means is an elongated frame-like structure having tracks; a wheeled carriage mounted on said tracks; and said lance means being mounted on said carriage.

3. An apparatus for peening pressure vessels and the like as in claim 1 wherein said cradle means is a cage-like structure having spaced ring-like structural members; and bearing means carried by said support means rotatably engaging said ring-like members to support and locate said cradle means with respect to said support means.

4. An apparatus for peening vessels and the like as in claim 1 wherein said nozzle means consists of several nozzles whereby several streams of beads can be propelled against the pressure vessel.

5. An apparatus for peening pressure vessels or the like as in claim 1 wherein said nozzle means is a single nozzle adapted for use with small pressure vessels.

6. An apparatus for peening pressure vessels or the like as in claim 1 wherein deflector means covers said nozzle means; and means to remove said deflector means when said bead propelling means is providing the proper quantity of beads at a suitable pressure.

7. An apparatus for peening pressure vessels or the like as in claim 1 wherein said power means includes a motor for rotating said cradle and a pressure vessel carried thereby; a second motor for advancing said lance means in said pressure vessel; and a third motor for rotating said nozzle means with respect to said lance means.

8. An apparatus for peening pressure vessels and the like as in claim 1 wherein said control means includes programming means for rotating the cradle means at a predetermined speed, and for rotating the nozzle means through a predetermined angle and at a given speed.

9. An apparatus for peening pressure vessels and the like as in claim 1 wherein said bead propelling means includes means for maintaining a uniform rate of bead flow; means for returning beads utilized in peening; and means for separating broken beads and dust the bead propelling means.

10. An apparatus for peening pressure vessels and the like as in claim 1 wherein said bead propelling apparatus includes auxiliary bead supply means; said auxiliary bead supply means adding beads to the bead propelling apparatus upon the breakage of a predetermined quantity of beads.

11. An apparatus for peening pressure vessels and the like as in claim 1 wherein a manifold is fixed to the pressure vessel mouth and surrounds the lance means and is adapted to close the mouth of the pressure vessel; said manifold carrying a vent to atmosphere and exhaust lines for returning beads and debris to the bead propelling means.

12. An aparatus for inducing compressive stresses into a pressure vessel to avoid stress corrosion comprising: support structure including a pair of spaced tracks; a cradle located at one end of said support structure; said cradle having support rings connected by spacer bars positioned at intervals about the rings; bearings carried by said tracks engaging said rings for rotatably mounting said cradle on said support means; locator assemblies engaging the ends of said rings for longitudinally positioning said cradle; a motor and drive train connected to said cradle for rotating it with respect to said support means; a wheeled carriage mounted on said tracks, a motor and drive train connected to said carriage for moving it with respect to said cradle; a lance fixed to said carriage and being positioned so as to enter a pressure vessel carried by said cradle; a nozzle pivotally connected to the end of the lance; a motor and drive train connected to said nozzle for moving it through an arc; bead propelling mechanism having lines carried by said lance and connected to said nozzle; and control means for regulating the rotation of said cradle and pressure vessel carried thereby, the movement of the carriage, lance and nozzle, the arc traversed by the nozzle and the rate and pressure of beads providing uniform peening of all surfaces of the pressure vessel subjected to stress corrosion.

13. A method for preventing stress corrosion in a pressure vessel comprising:
positioning the pressure vessel for peening; and uniformly peening the entire inside surface of the pressure vessel introducing a compressive stress in the material greater than the stress to which the pressure vessel will be subjected to under pressure.

14. A method for preventing stress corrosion in a pressure vessel as in claim 13 including cleaning the pressure vessel; rotating the pressure vessel; pivoting a peening nozzle through an arc while the pressure vessel is rotating to peen an end of the pressure vessel; fixing the peening nozzles and advancing it along the rotating pressure vessel; again pivoting the peening nozzle through an arc to peen the other end of the rotating pressure vessel.

15. A method for preventing stress corrosion in a pressure vessel as in claim 14 including the step of maintaining bead flow at all times substantially normal to the surface being peened.

16. A method for preventing stress corrosion in a pressure vessel as in claim 13 including the steps of rotating the pressure vessel; positioning the pressure vessel so that used beads and debris flow to one end of the pressure vessel; evacuating the beads and debris; separating the debris from the used beads; returning the beads to the bead propelling machine; and re-using the beads.

17. A method for preventing stress corrosion in a pressure vessel as in claim 13 including the steps of maintaining the rate of bead flow; and increasing the propelling pressure as the number of beads decrease due to breakage.

18. A method for preventing stress corrosion in a pressure vessel as in claim 13 including the steps of inducing a compressive stress of approximately 100 K s.i. in the inner surface of the pressure vessel, and indenting said inner surface from .012 to .014 inch.

19. A method for preventing stress corrosion and reducing points of stress concentration in a pressure vessel comprising the steps of: cleaning the pressure vessel; rotating the pressure vessel; pivoting a peening nozzle through an arc while the pressure vessel is rotating to peen an end of the pressure vessel; fixing the peening nozzles and advancing it to peen along the rotating pressure vessel; again pivoting the peening nozzle through and arc to peen the other end of the rotating pressure vessel; positioning the pressure vessel so that used beads and debris flow to one end of the pressure vessel; evacuating the beads and debris; separating the debris from the used beads; returning the beads to a bead propelling machine; reusing the beads; and programing the above steps to maintain uniform peening of the entire inner surface of the pressure vessel.

20. A method for preventing stress corrosion in a pressure vessel as in claim 13 including the steps of rotating the pressure vessel at a programed varying speed; and pivoting a peening nozzle through a programed arc while the pressure vessel is rotating to peen the entire inner surface of the pressure vessel.

(References on following page)

References Cited

UNITED STATES PATENTS

| | | | |
|---|---|---|---|
| 708,880 | 9/1902 | Heideger | 51—15 |
| 1,116,776 | 11/1914 | Wilcox | 72—53 |
| 1,628,317 | 5/1927 | Hoevel | 51—12 |
| 2,041,355 | 5/1936 | Koether | 72—53 |
| 2,900,765 | 8/1959 | Blackburn | 51—9 |
| 3,199,171 | 8/1965 | Hellmann | 29—90 |
| 3,396,492 | 8/1968 | Schenck | 51—8 |
| 3,427,763 | 2/1969 | Maasberg | 51—321 |

FOREIGN PATENTS 13,808  6/1928  Australia.

CHARLES W. LANHAM, Primary Examiner.

GENE P. CROSBY, Assistant Examiner.

U.S. Cl. X.R.

51—319